(12) United States Patent
Subramaniam et al.

(10) Patent No.: US 10,592,153 B1
(45) Date of Patent: Mar. 17, 2020

(54) REDISTRIBUTING A DATA SET AMONGST PARTITIONS ACCORDING TO A SECONDARY HASHING SCHEME

(71) Applicant: Amazon Technologies, Inc., Seattle, WA (US)

(72) Inventors: Naveen Anand Subramaniam, Seattle, WA (US); Jacob Shannan Carr, Seattle, WA (US); Aaron Ben Fernandes, Redmond, WA (US); Gaurav Gupta, Sammamish, WA (US); Brian Thomas Kachmarck, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 205 days.

(21) Appl. No.: 15/696,054

(22) Filed: Sep. 5, 2017

(51) Int. Cl.
*G06F 3/06* (2006.01)

(52) U.S. Cl.
CPC ............ *G06F 3/0647* (2013.01); *G06F 3/061* (2013.01); *G06F 3/067* (2013.01); *G06F 3/0644* (2013.01)

(58) Field of Classification Search
CPC combination set(s) only.
See application file for complete search history.

(56) References Cited

U.S. PATENT DOCUMENTS

| 5,515,531 | A | 5/1996 | Fujiwara et al. |
| 7,860,843 | B2 | 12/2010 | Dodd et al. |
| 8,842,679 | B2 * | 9/2014 | Koponen ............ H04L 12/4633 370/396 |
| 2005/0097105 | A1 | 5/2005 | Ranta |
| 2015/0205885 | A1 * | 7/2015 | Zhou ...................... G06F 16/81 707/742 |

* cited by examiner

*Primary Examiner* — Shyue Jiunn Hwa
(74) *Attorney, Agent, or Firm* — Robert C. Kowert; Kowert, Hood, Munyon, Rankin & Goetzel, P.C.

(57) ABSTRACT

Items within a data set can be redistributed to different partitions of a distributed data store according to modified hash values. A redistribution event may, in some embodiments, trigger the redistribution of a data set. Modified hash values for items in the data set may be generated according to a secondary hashing scheme to be used for identifying the location of a new partition to store the item instead of hash values based on current key values that identify a current partition that stores the item. Access can be provided to items based on the modified hash values to determine the new partition that stores the item after redistribution.

20 Claims, 10 Drawing Sheets

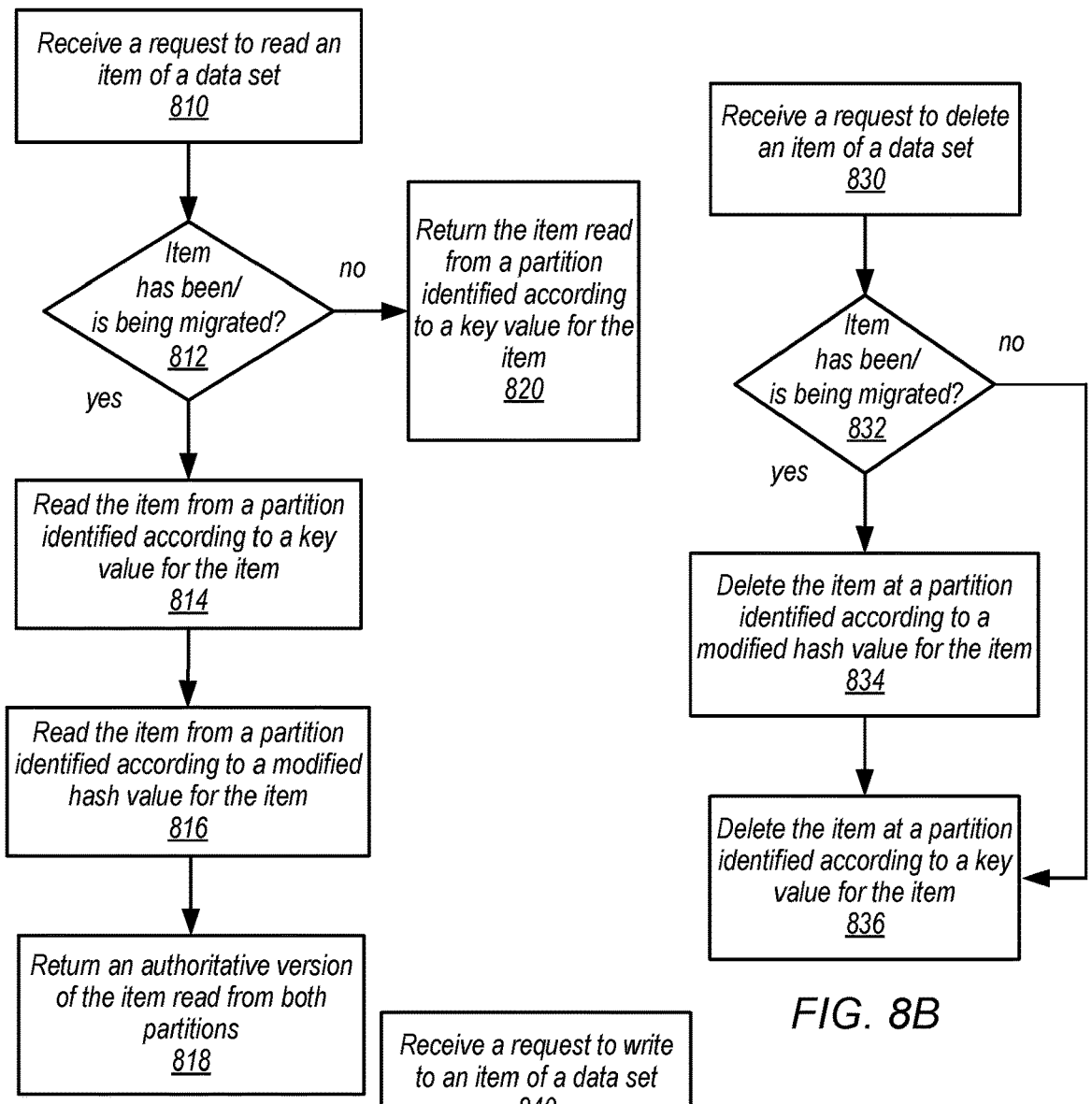
FIG. 8A
FIG. 8B
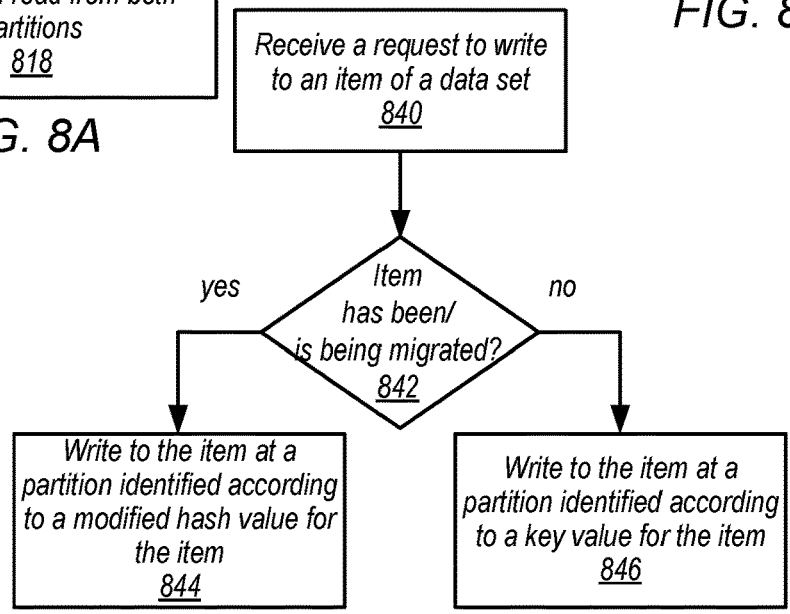
FIG. 8C

REDISTRIBUTING A DATA SET AMONGST PARTITIONS ACCORDING TO A SECONDARY HASHING SCHEME

BACKGROUND

Data is often distributed to scale the storage capacity or processing capacity of systems that provide access to the data. For example, database tables or other data objects can be divided into partitions in order to leverage the capacity of different hosts, such as different servers or other computing devices, to separately provide access to individual partitions. Distributed storage can also provide the opportunity to change the configuration or partitioning of data, such as by increasing, decreasing, or otherwise changing the location of data by migrating items of data from one location to another. Migrating items, however, can impede the performance of distributed systems by blocking or delaying access to partitions of data that are migrated. Techniques that can provide migration techniques that minimize or eliminate the impact upon the ability of users to access data are, therefore, highly desirable.

BRIEF DESCRIPTION OF THE DRAWINGS

FIGS. 8A-8C are a high-level flowcharts illustrating various methods and techniques for handling access requests for write-once items being redistributed, according to some embodiments.

Figure 1:
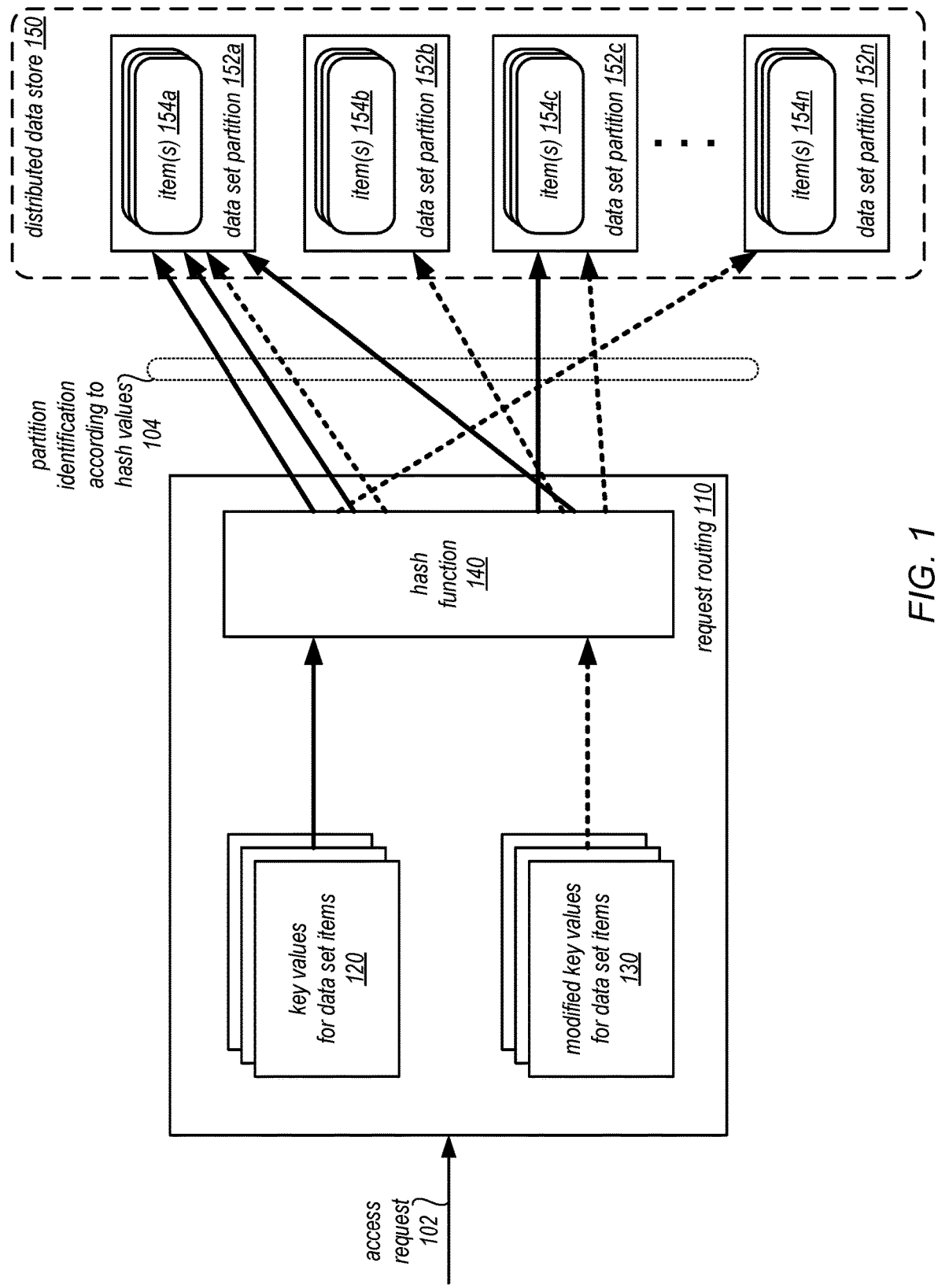
FIG. 1 is a logical block diagram illustrating redistributing a data set amongst partitions according to a secondary hashing scheme, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

The systems and methods described herein may be employed in various combinations and in various embodiments to implement redistributing a data set amongst partitions according to a secondary hashing scheme, according to some embodiments. Data (e.g., data objects, structures, or other items) may be distributed across one or more locations in a storage system in different partitions, in some embodiments. In this way, clients can access and independently update different partitions of the data set at the one or more locations in the storage system, in some embodiments. For example, partitions may be identified and created according to schemes that distribute the data amongst partitions evenly, such as hash-based partitioning schemes. The partitions can then be evenly assigned or allocated to different locations within the distributed system so that the processing responsibility may be evenly distributed, in one embodiment.

Distributed systems often operate in dynamic environments where the workload, size of the data being stored, or performance of components within the distributed system can change. For example, partitioning schemes to distribute data amongst partitions may become less effective if some partitions are more frequently accessed then others. In some scenarios, the data itself may result in imbalanced or less optimal distributions of data across a distributed system. Data sets using a key value with low cardinality or selectivity to distribute the data with respect to the range of possible hash values used in a distribution scheme, for instance, could result in some partitions storing many different items while other partitions store very few (e.g., because the small number of unique, and thus low cardinality values, used for the key to distribute the data does not vary the distribution of data amongst the partitions as widely). Systems that implement redistributing a data set amongst partitions according to a secondary hashing scheme, however, can perfect distribution schemes, like hash functions, so that balanced distribution of data can be performed.

Secondary hashing schemes can generate or result in modified hash values to use for distributing or locating data, in some embodiments. For example, a secondary hashing scheme may apply a different hash function (e.g., than the hash function originally used to distribute data). In another example of a secondary hashing scheme, the key values of items input to the original hash function may be modified to generate modified hash values—even though the same hash function is applied in the secondary hashing scheme. FIG. 1 is a logical block diagram illustrating redistributing a data set amongst partitions according to modified key values, according to some embodiments. A data set, such as a database, may be divided into different partitions according to a partitioning schema, such as hash function 140. Partitioning key values for data set items 120 may be input to hash function 140 in order to generate hash values, which are then mapped 104 or assigned to data set partitions to identify the partition, such as data set partitions 152*a*, 152*b*, 152c, and 152n, that store items, such as items 154a, 154b, 154c, and 154n, of a data set in distributed data store 150 for service of access requests 102 (e.g., requests to read, write, delete, change or otherwise modify item(s) 152) received at request routing 110.

The data set may be one or more data structures, objects or other groupings of data distributed amongst multiple locations for storage and access, in some embodiments. For example, different storage nodes or hosts, as discussed below with regard to FIG. 2, may be implemented to store one or more partitions 152 of a data set. In some embodiments, the storage hosts or nodes may be one or more virtual or physical storage devices, processing devices, servers or other computing systems, such as computing system 1000 discussed below with regard to FIG. 9 that may store data for a data set.

In some scenarios, it may be desirable to redistribute the items 154 of a data set amongst the partitions. For example, as discussed below with regard to FIGS. 3 and 4, redistribution events may be detected and trigger the redistribution of items from one partition to another, in some embodiments. Modified key values for data set items 130 may be generated according to a secondary hash scheme, as discussed below with regard to FIGS. 4 and 5. The modified key values 130 may achieve a different and more optimal distribution of items 154 amongst partitions when input to hash function 140 to generate the hash values for locating items among partitions (as illustrated by the dotted line outputs from hash function 140 showing different mappings). The hash function 140 may be perfected, in some embodiments, in order to provide a balanced distribution of hash values generated for items (based on modified key values). Thus, modifications to generate the modified key values 130 may enforce or impose greater selectivity or cardinality on the modified key values than the unmodified key values 120.

Redistribution of items according to modified hash values may be incrementally performed, as discussed below with regard to FIG. 6. For example, in some embodiments, items may be selected according to the migration impact that moving the item has upon source and/or destination partitions 152. If, for instance, the migration would cause resource utilization at a node or host for the target partition to exceed a migration threshold, then that item may not yet be migrated. Mappings between modified key values 130 and key values for data items may be maintained, in some embodiments, so that items that have not been migrated, are in process of being migrated, or already migrated may be located at either the source or target partition for the respective item, as discussed below with regard to FIGS. 7-8C.

Please note that previous descriptions of redistributing a data set amongst partitions according to modified hash values are not intended to be limiting, but are merely provided as logical examples. The number of items or partitions may be different as selected for migration may be different, for example, or the configuration or implementation of request routing may be different.

This specification begins with a general description of a database service. The database service may implement redistributing a data set amongst partitions according to modified hash values, in one embodiment. Then various examples of a database service are discussed, including different components/modules, or arrangements of components/module, that may be employed as part of implementing the database service, in one embodiment. A number of different methods and techniques to implement redistributing a data set amongst partitions according to modified key values are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
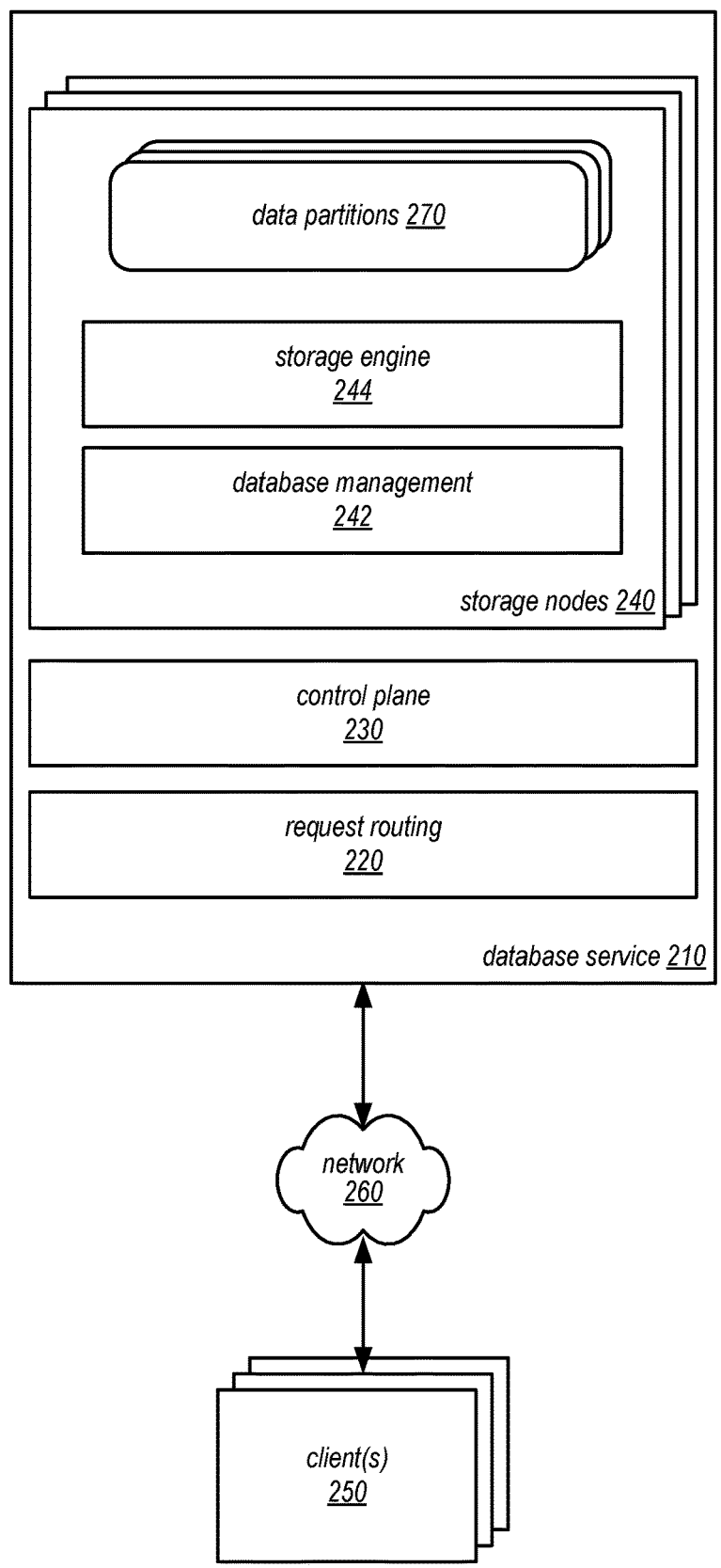
FIG. 2 is a logical block diagram illustrating a database service that may store data sets on behalf of users, according to some embodiments.

FIG. 2 is a logical block diagram illustrating a database service that may store data sets on behalf of users, according to some embodiments. Database service 210 may be implemented as a standalone service or as part of a provider network. Database service 210 may be a private or closed system, in one embodiment, or may be set up by an entity such as a company or a public sector organization to provide one or more database services (such as various types of cloud-based storage) accessible via the Internet and/or other networks to clients 250, in another embodiment. In one embodiment, database service 210 may be implemented in a single location or may include numerous data centers hosting various resource pools, such as collections of physical and/or virtualized computer servers, storage devices, networking equipment and the like (e.g., computing system 1000 described below with regard to FIG. 9), needed to implement and distribute the infrastructure and storage services offered by database service 210. In one embodiment, database service 210 relational or non-relational (NoSQL) database query engines, or other data processing services as part of other services, such as map reduce processing, data warehouse, data flow processing, and/or other large scale data processing techniques.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), in one embodiment, each of which may be similar to the computer system embodiment illustrated in FIG. 9 and described below. In one embodiment, the functionality of a given system or service component (e.g., a component of database service(s) 210) may be implemented by a particular node or may be distributed across several nodes. In some embodiments, a given node may implement the functionality of more than one service system component (e.g., more than one data store component).

Database service(s) 210 may include various types of database services, in one embodiment, (both relational and non-relational) for storing, querying, and updating data. Such services may be enterprise-class database systems that are highly scalable and extensible. In one embodiment, queries may be directed to a database in database service(s) 210 that is distributed across multiple physical resources, and the database system may be scaled up or down on an as needed basis. The database system may work effectively with database schemas of various types and/or organizations, in different embodiments. In one embodiment, clients/subscribers may submit queries in a number of ways, e.g., interactively via a SQL interface to the database system. In other embodiments, external applications and programs may submit queries using Open Database Connectivity (ODBC) and/or Java Database Connectivity (JDBC) driver interfaces to the database system. In one embodiment, database service(s) 210 may provide a RESTful programmatic interface in order to submit access requests (e.g., to get, insert, delete, or query data). In one embodiment, database service(s) 210 may also be any of various types of data processing services to perform different functions (e.g., query or other processing engines to perform functions such as anomaly detection, machine learning, data lookup, or any other type of data processing operation). For example, in at least one embodiment, database service(s) 210 may include a map reduce service that creates clusters of storage nodes that implement map reduce functionality over data stored in another service in provider network 200. Various other distributed processing architectures and techniques may be implemented by database service(s) 210 (e.g., grid computing, sharding, distributed hashing, etc.) in another embodiment. In at least some embodiments, database service 210 may implement an in-memory database, which may utilize a non-relational or key-value based structure for managing data, such as Redis.

In one embodiment, clients 250 may encompass any type of client configurable to submit network-based requests to provider network 200 via network 260, including requests for database service(s) 210 (e.g., to perform a query with respect to a table stored in database service 210). For example, in one embodiment a given client 250 may include a suitable version of a web browser, or may include a plug-in module or other type of code module that executes as an extension to or within an execution environment provided by a web browser. Alternatively in a different embodiment, a client 250 may encompass an application such as a database application (or user interface thereof), a media application, an office application or any other application that may make use of storage resources in data storage service(s) to store and/or access the data to implement various applications. In one embodiment, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that interacts directly with database service 210, in one embodiment. In one embodiment, client 250 may generate network-based services requests according to a Representational State Transfer (REST)-style network-based services architecture, a document- or message-based network-based services architecture, or another suitable network-based services architecture.

In one embodiment, a client 250 may provide access to database service 210 to other applications in a manner that is transparent to those applications. For example, client 250 may integrate with a database on database service(s) 210. In such an embodiment, applications may not need to be modified to make use of the storage system service model. Instead, the details of interfacing to the database service(s) 210 may be coordinated by client 250.

Client(s) 250 may convey network-based services requests to and receive responses from database service 210 via network 260, in one embodiment. In one embodiment, network 260 may encompass any suitable combination of networking hardware and protocols necessary to establish network-based-based communications between clients 250 and database service 210. For example, network 260 may encompass the various telecommunications networks and service providers that collectively implement the Internet. In one embodiment, network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client(s) 250 and the Internet as well as between the Internet and database service 210. It is noted that in one embodiment, client(s) 250 may communicate with database service 210 using a private network rather than the public Internet.

Database service 210 may implement request routing 220, as discussed in more detail below with regard to FIG. 3, in one embodiment. Request routing 220 may receive, authenticate, parse, throttle, and/or dispatch service or other access requests, among other things, in one embodiment. In one embodiment, database service 210 may implement control plane 230 to implement one or more administrative components, which may provide a variety of visibility and/or control functions. In one embodiment, database service 210 may also implement a plurality of nodes, which may implement a database in distributed fashion as storage nodes 240. A database may be divided into multiple partitions 270, which may be distributed amongst the storage nodes 240. Each node may manage one or more partitions 270 of the database on behalf of clients/users.

Control plane 220 may provide visibility and control to system administrators, detect migration events or roll-back events for migration, as discussed below with regard to FIGS. 5-8, and/or anomaly control, resource allocation, in one embodiment. In one embodiment, control plane 220 may also include an admin console, through which system administrators may interact with database service 210 (and/or the underlying system). In one embodiment, the admin console may be the primary point of visibility and control for database service 210 (e.g., for configuration or reconfiguration by system administrators). For example, the admin console may be implemented as a relatively thin client that provides display and control functionally to system administrators and/or other privileged users, and through which system status indicators, metadata, and/or operating parameters may be observed and/or updated. Control plane 220 may provide an interface or access to information stored about one or more detected control plane events, such as split requests to be processed, at database service 210, in one embodiment.

Control plane 220 may direct the performance of different types of control plane operations among the nodes, systems, or devices implementing database service 210, in one embodiment. For instance, control plane 220 may communicate with nodes 240 to initiate the performance of various control plane operations, such as update tables, delete tables, create indexes, etc. . . . . . In one embodiment, control plane 220 may update a task registry (or some other table or data structure) with the status, state, or performance information of the control plane operations currently being performed.

Request routing 220 may support handling requests formatted according to an interface to support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables) performed by control plane 230 or storage nodes 240. In one embodiment, database service 210 may support different types of web services requests. For example, in one embodiments, database service 210 may implement a particular web services application programming interface (API) that supports a variety of operations on tables (or other data objects) that are maintained and managed on behalf of clients/users by the data storage service system (and/or data stored in those tables). In one embodiment, request routing 220 may perform parsing and/or throttling of service requests, authentication and/or metering of service requests, dispatching service requests, and/or maintaining a partition assignments that map storage nodes to partitions (e.g., according to key values or modified hash values, like the modified key values discussed above with regard to FIG. 1 and below with regard to FIG. 3).

In some embodiments, storage nodes 240 may implement database management 242. Database management 242 may create, update, define, query, and/or otherwise administer databases, in one embodiment. For instance, database management 242 may maintain a database according to a database model (e.g., a relational or non-relational database model). In one embodiment, database management 242 may allow a client to manage data definitions (e.g., Data Definition Language (DDL) requests to describe column definitions, requests to add item attributes, etc.). In one embodiment, database management 242 may handle requests to access the data (e.g., to insert, modify, add, or delete data as well as requests to query for data by generating query execution plans to determine which partitions of a database may need to be evaluated or searched in order to service the query). In one embodiment, database management 242 may also perform other management functions, such as enforcing access controls or permissions, concurrency control, or recovery operations. In one embodiment, storage nodes 240 may implement storage engine 244 to access partitions 270 in storage in order to process access requests (e.g., requests to read or write to items within different partitions or particular items or parts of data within a partition).

In one embodiment, database service 210 may provide functionality for creating, accessing, and/or managing tables processed at nodes within a single-tenant environment than those that provide functionality for creating, accessing, and/or managing tables maintained in nodes within a multi-tenant environment. In another embodiment, functionality to support both multi-tenant and single-tenant environments may be included in any or all of the components illustrated in FIG. 2. For example, a node that is member of a cluster for hosting user A's database, may also store a partition of another database for user B, as part of a different cluster, in one embodiment.

In addition to dividing or otherwise distributing data sets across storage nodes in separate partitions, nodes may also be used to implement or maintain resources in multiple different arrangements, some of which may be part of larger collections or groups of resources. A replica group, for example, may be composed of a number of nodes maintaining a replica of a partition for the database service 210. Moreover, different replica groups may utilize overlapping nodes, where a storage node may be a member of multiple replica groups, maintaining replicas for each of those groups whose other storage node members differ from the other replica groups. Thus if, for example replica group 1 has storage nodes A, B, and C, replica group 2 may have storage nodes B, D, and E. Besides differing groups of storage nodes, in various embodiments, storage nodes may have different relationships to other storage nodes. Continuing with the above example, for replica group 1, storage node A may be a master node, performing special functions with regard to access requests directed toward the partition maintained by replica group 1. For replica group 2, however, storage node B may be the master node. Therefore, a storage node's relationship to other storage nodes may be different depending on the particular grouping evaluated. These various examples of different arrangements of resources among storage nodes highlight the various different ways that control plane operations may interact with resources that are not solely devoted to one particular (though they may be) function, data replica, etc.

In at least some embodiments, the systems underlying the database service 210 described herein may store data on behalf of storage service clients (e.g., client applications, users, and/or subscribers) in tables containing items that have one or more attributes. In some embodiments, database service 210 may present clients/users with a data model in which each table maintained on behalf of a client/user contains one or more items, and each item includes a collection of attributes. The attributes of an item may be a collection of name-value pairs (sometimes referred to as key-value pairs, where the name is the name of the key and the value is the value of the key), in any order. In some embodiments, each attribute in an item may have a name, a type, and a value. Some attributes may be single valued, such that the attribute name is mapped to a single value, while others may be multi-value, such that the attribute name is mapped to two or more values. In some embodiments, the name of an attribute may always be a string, but its value may be a string, number, string set, or number set. The following are all examples of attributes: "ImageID"=1, "Title"="flower", "Tags"={"flower", "jasmine", "white"}, "Ratings"={3, 4, 2}. The items may be managed by assigning each item a primary key value (which may include one or more attribute values), and this primary key value may also be used to uniquely identify the item. In some embodiments, a large number of attributes may be defined across the items in a table, but each item may contain a sparse set of these attributes (with the particular attributes specified for one item being unrelated to the attributes of another item in the same table), and all of the attributes may be optional except for the primary key attribute(s). In other words, the tables maintained by the database service 210 (and the underlying storage system) may have no pre-defined schema other than their reliance on the primary key. In at least some embodiments, the primary key may be the key used as the key from which hash values or modified hash values are generated, while in other embodiments a combination of one or more other keys may be used. Note that in some embodiments, if an attribute is included in an item, its value cannot be null or empty (e.g., attribute names and values cannot be empty strings), and, and within a single item, the names of its attributes may be unique. However, in at least some other embodiments, pre-defined database schemes may be employed, such as the various types of relational databases implemented using Server Query Language (SQL).

In some embodiments, data partitions of a data set or table may store items that are different kinds of data structures. Write-once data structures, for instance may be implemented in some embodiments. A write-once data structure may be accessed so that writes occur once without being overwritten by a subsequent write to the item, in some embodiments. A queue structure may be a write-once data structure, in some embodiments. Other data structures may also be stored as items, in some embodiments.

Database service 210 may provide an application programming interface (API) for requesting various operations, including operations increasing the number of nodes in a cluster or reducing the number of nodes in a cluster, or operations targeting tables, indexes, items, and/or attributes maintained on behalf of storage service clients. In some embodiments, the service (and/or the underlying system) may provide both control plane APIs and data plane APIs.

The control plane APIs provided by database service 210 (and/or the underlying system) may be used to manipulate table-level entities, such as tables and indexes and/or to re-configure various tables. These APIs may be called relatively infrequently (when compared to data plane APIs). In some embodiments, the control plane APIs provided by the service may be used to create tables or secondary indexes for tables at separate storage nodes, import tables, export tables, delete tables or secondary indexes, explore tables or indexes (, modify table configurations or operating parameter for tables or secondary indexes (e.g., by modifying the amount of throughput capacity, adding storage capacity for additional read replicas, splitting partitions or moving partitions), and/or describe tables or indexes. In some embodiments, control plane APIs that perform updates to table-level entries may invoke asynchronous workflows to perform a requested operation. Methods that request "description" information (e.g., via a describeTables API) may simply return the current known state of the tables or secondary indexes maintained by the service on behalf of a client/user. The data plane APIs provided by database service 210 (and/or the underlying system) may be used to perform item-level operations, such as storing, deleting, retrieving, and/or updating items and/or their attributes, or performing index-based search-type operations across multiple items in a table, such as queries and scans.

The APIs provided by the service described herein may support request and response parameters encoded in one or more industry-standard or proprietary data exchange formats, in different embodiments. For example, in various embodiments, requests and responses may adhere to a human-readable (e.g., text-based) data interchange standard, (e.g., JavaScript Object Notation, or JSON), or may be represented using a binary encoding (which, in some cases, may be more compact than a text-based representation). In various embodiments, the system may supply default values (e.g., system-wide, user-specific, or account-specific default values) for one or more of the input parameters of the APIs described herein.

Database service 210 may include support for some or all of the following operations on data maintained in a table (or index) by the service on behalf of a storage service client: put (or store) an item, get (or retrieve) one or more items having a specified primary key, delete an item, update the attributes in a single item, query for items using an index, and scan (e.g., list items) over the whole table, optionally filtering the items returned, or conditional variations on the operations described above that are atomically performed (e.g., conditional put, conditional get, conditional delete, conditional update, etc.). For example, the data storage service (and/or underlying system) described herein may provide various data plane APIs for performing item-level operations, such as a PutItem API, a GetItem (or GetItems) API, a DeleteItem API, and/or an UpdateItem API, as well as one or more index-based seek/traversal operations across multiple items in a table, such as a Query API and/or a Scan API.

Figure 3:
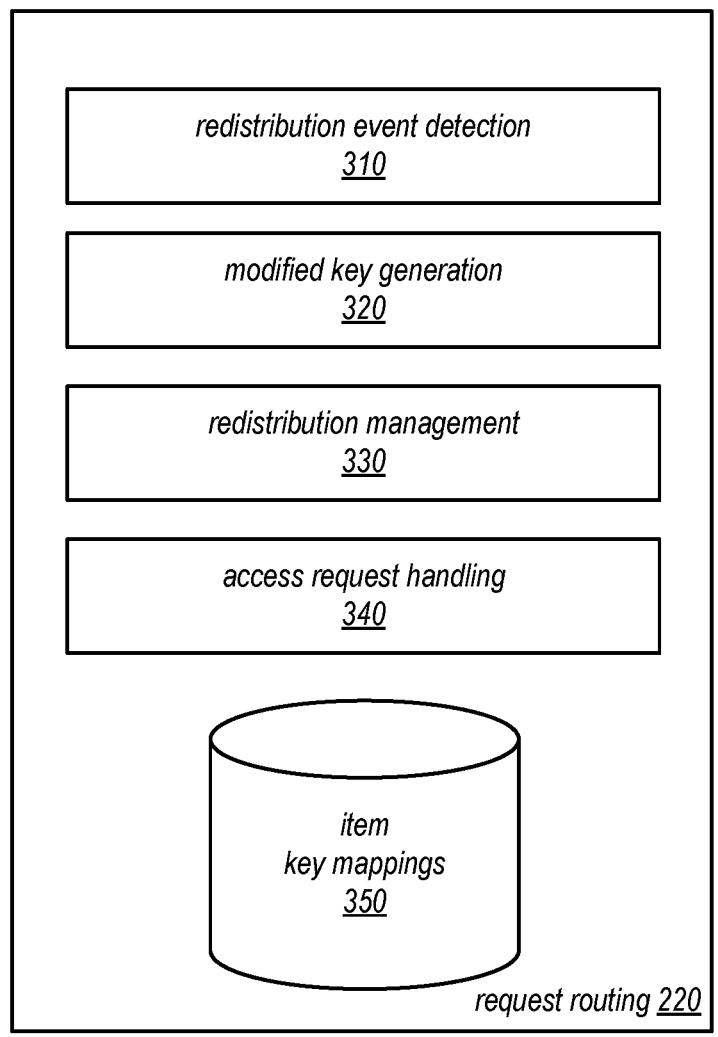
FIG. 3 is a logical block diagram illustrating request routing that can redistribute a data set amongst partitions according to a secondary hashing scheme, according to some embodiments.

FIG. 3 is a logical block diagram illustrating request routing that can redistribute a data set amongst partitions according to modified key values, according to some embodiments. Request routing 220 may implement redistribution event detection 310, in some embodiments. Redistribution event detection 310 may monitor performance metrics received from health monitoring or other components that retrieve metrics from storage nodes and compare them with redistribution event criteria. In some embodiments, redistribution event detection may monitor requests rates for items, partitions, or types of requests and compare them with redistribution event criteria. Request routing 220 may compare item key mappings 350 with request routing criteria, in some embodiments. Redistribution event criteria may include one or more threshold values for performance metrics, requests rates, or distribution profiles or partition assignment thresholds for items. For example, the performance metrics may be compared with the performance thresholds to detect overburdened partitions, which may trigger a redistribution event. Similarly, requests may detect overburdened partitions, which may trigger a redistribution event when in excess of a threshold values for requests rates. Distribution profiles may be compared with the number of items assigned to different partitions to trigger a redistribution event if a number of partitions exceeding a threshold value have more items in the partition outside of the distribution profile (e.g., standard deviation).

Once a redistribution event is detected, redistribution management may create, track, monitor, execute, and/or direct a redistribution task for a data set. Redistribution events may, in some embodiments, be limited to a single data set, so that other partitions of other data sets stored on a same storage node (e.g., that is multi-tenant) are not redistributed. Redistribution management 330 may trigger the generation of modified keys at modified key generation 320 for the data set. For example, as discussed below with respect to FIG. 5, modified keys may be generated in order to perfect the distribution of the hash function used to distribute items by creating modified key values that when hashed by the hash function are more evenly distributed, in some embodiments. Modified key generation 320 may store mappings that map current key values to modified key values in item key mappings 350, in some embodiments. In at least some embodiments, the modified key values may be inserted and or stored as part of a symbol table that maintains the mappings.

Redistribution management 330 may also initiate the operations to migrate items from a source partition to a target partition, as discussed below with regard to FIG. 6. Request routing 220 may implement access request handling to determine whether access requests are directed to a source or target partition (or both), or denied, in some embodiments. For example, for items that can be written to multiple times, migration may include blocking access requests (or at least writes to) the item while it is copied from one partition to another and deleted from the source partition, as discussed below with regard to FIG. 7. In some embodiments, migration may be performed by directing new writes to the item to the target partition and reads to both the source and target partition, as discussed below with regard to FIGS. 8A-8C.

Figure 4:
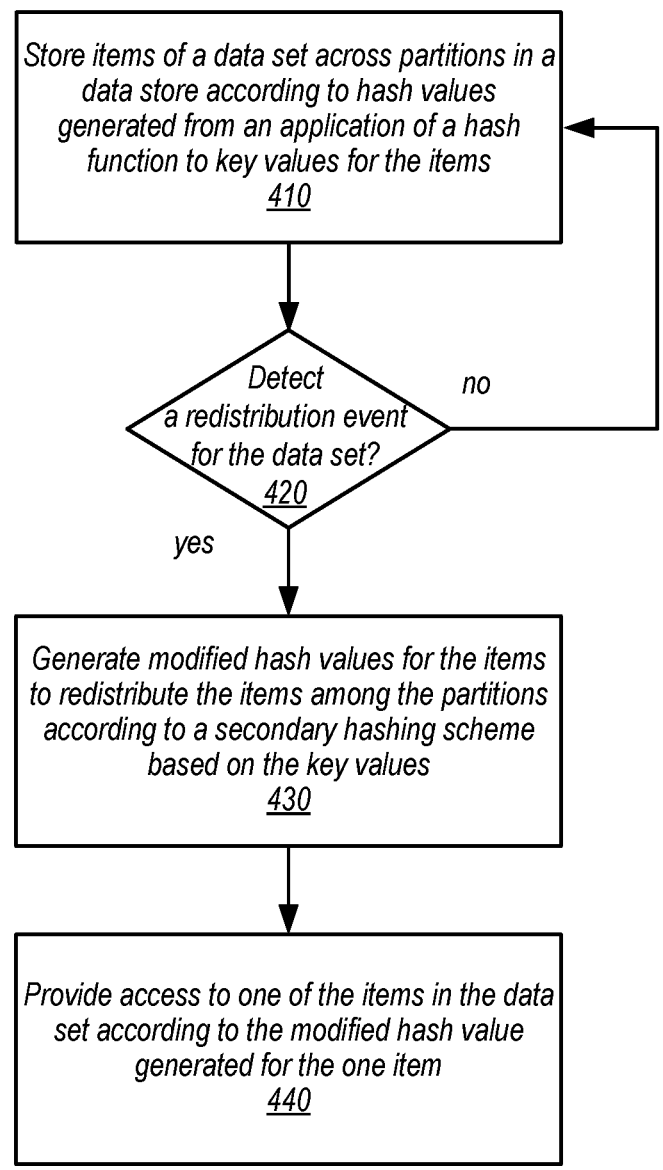
FIG. 4 is a high-level flowchart illustrating various methods and techniques to handle a redistribution event for a data set, according to some embodiments.

The examples of redistributing a data set amongst partitions according to modified key values as discussed in FIGS. 2-3 above have been given in regard to a database service (e.g., a non-relational or NoSQL database service or a relational database service). However, various other types of data access, management, or control systems or data processing systems may redistributing a data set amongst partitions according to modified hash values generated according to a secondary hashing scheme, in other embodiments. FIG. 4 is a high-level flowchart illustrating various methods and techniques to handle a redistribution event for a data set, according to some embodiments. These techniques, as well as the techniques discussed with regard to FIGS. 5-8C, may be implemented using components or systems as described above with regard to FIGS. 2-3, as well as other types of databases, storage engines, systems, or clients and thus the following discussion is not intended to be limiting as to the other types of systems that may implement the described techniques.

As indicated at 410, items of a data set may be stored across partitions in a data store according to hash values generated from an application of a hash function to key values for the items, in some embodiments. For example, when an item is added, uploaded, written, or otherwise included as part of the data set, a hash value is generated for key value for the item. The key value may be a primary key or other unique identifier for the item, in some embodiments. The hash value may then be compared with hash value mappings that assign items with certain hash values (e.g., within a range of hash values) to partitions. In some embodiments, the partitions may be physical partitions, such as physical storage devices like hard disk drives or solid state drives. In other embodiments, the partitions may be virtual (e.g., in order to provide a large number of partitions when performing techniques such as modified key value generation as discussed below with regard to FIG. 5. Once a partition is identified, the item may be stored so as to be included in the partition (e.g., on a storage device allocated to or mapped to the partition at a storage node that hosts the partition), in some embodiments.

As indicated a 420, a redistribution event for a data set may be detected, in some embodiments. Redistribution events may trigger the redistribution of items in the data set to different partitions in some embodiments. Redistribution events may be detected by comparing various performance or other metrics, or other data indicative of poor data distribution with respective threshold and/or other criteria that if satisfied trigger the redistribution event. For example, if the request rate for 10 partitions exceeds X rate, then a redistribution event for the data set may be triggered. Redistribution events may be triggered with respect to individual data sets, in some embodiments, so that data for other data sets hosted alongside the redistributed data sets do not have to be redistributed as well.

As indicated at 430, modified hash values for the items may be generated according to a secondary hash scheme. In some embodiments, modified hash values may be generated by applying a different hash function to key values. The distribution characteristics of the different hash function may correct or perfect the deficiencies in distribution of the original hash function utilized at element 410 above. In some embodiments, the secondary hashing scheme may not apply a different hash function but instead apply the same hash function to different key values for the items in order to generate modified hash values. For example, as discussed below in detail with regard to FIG. 5, binary splitting operations over the range of possible hash values may be performed to enforce even distribution of items within the hash range, assigning items to hash values in the range of hash values and deriving the modified key value that when input into the hash function achieves the assigned hash value. Similarly, other techniques for subdividing the hash range to assign hash values to items may be implemented (e.g., by dividing the hash range times the number of items or by determining an approximate quartile summary (by performing streaming processing on key values) to identify the boundaries of key values that may achieve balanced distribution of items across the possible hash value range, in some embodiments.

As indicated at 440, access to one of the items in the data set may be provided according to the modified hash value generated according to the secondary hashing scheme for the one item, according to some embodiments. For example, the modified key value may be used to generate the modified hash value by applying the hash function. The hash function may be mapped to the partition that stores the item upon redistribution of the items in the data set, in one embodiment. Similarly, the different hash function may be applied to the item sought in access request to determine that stores the item upon redistribution, in some embodiments.

Figure 5A:
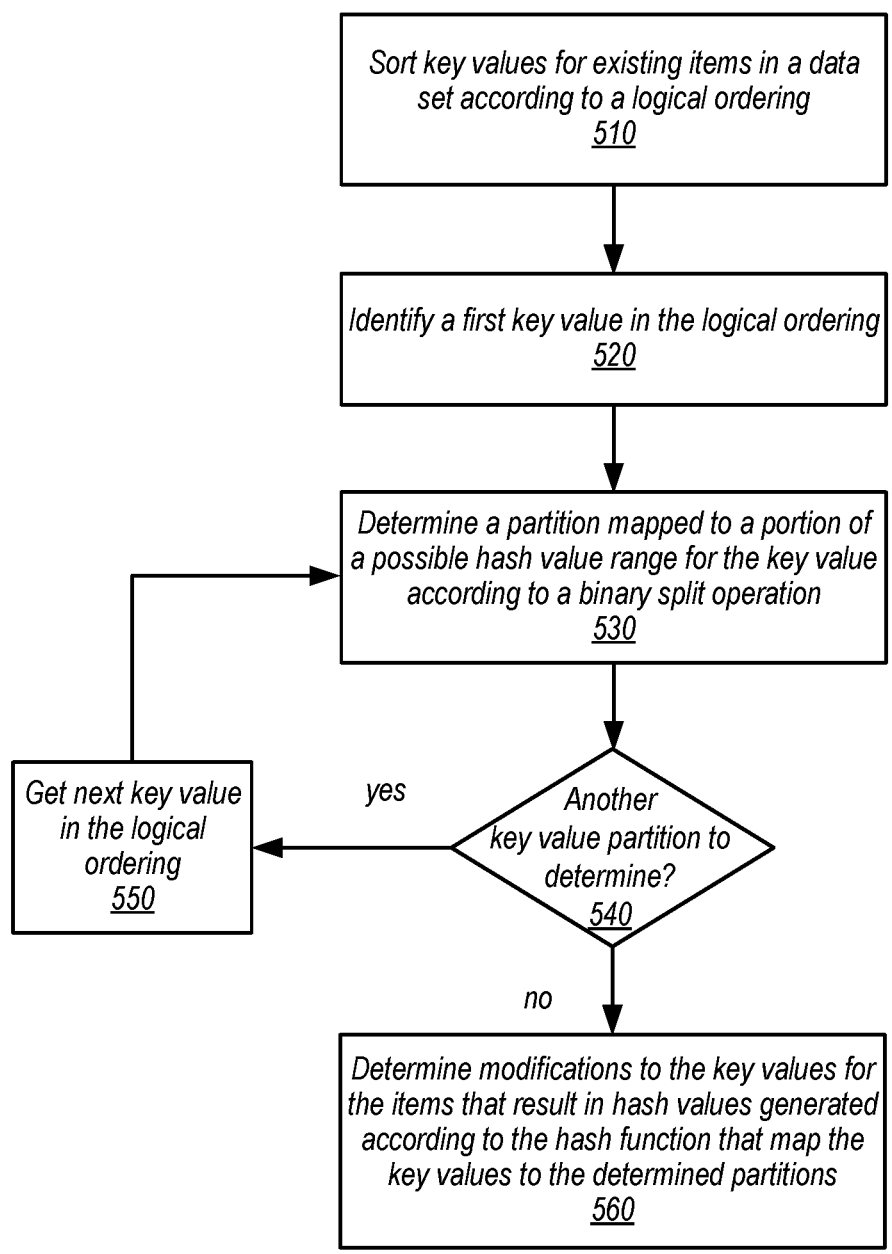
FIG. 5A is a high-level flowchart illustrating various methods and techniques to implement generating modified key values for redistributing a data set, according to some embodiments.

FIG. 5A is a high-level flowchart illustrating various methods and techniques to implement generating modified key values for redistributing a data set, according to some embodiments. As indicated at 510, key values for existing items in a data set may be sorted according to a logical ordering, in some embodiments. For example, key values may be ordered alphabetically, according to size (if numerical), or other logical ordering scheme.

As indicated at 520, a first key value in the logical ordering may be identified. If, for instance, the ordering of items is maintained in a list of key values, then the first entry in the list may be read. As indicated at 530 a partition mapped to portion of a possible hash value range for the key value may be determined according to a binary split operation, in some embodiments. For example, the partition may be determined according to binary split operation that divides a range of hash values into two ranges of hash values mapped to different partitions. Binary split operations may be recursively performed so that each iteration of determining a partition is equally spaced within the range of possible hash values as the last key value mapped, as discussed below with regard to FIG. 5B.

As indicated at 540, if another key value for the partition has yet to have a partition determined, then as indicated by the positive exit from 540, a next key value in the logical ordering may be gotten and the determination at 530 performed again. In this way, individual partitions may be determined for each item in the data set according to sequence of binary split operations, as discussed below with regard to FIG. 5B.

As indicated at 560, modifications to the key values may be determined for the items that result in hash values generated according to the hash function that map the key values to the determined partitions. For example, a prefix or suffix value may be combined or otherwise added or append to the key value in order to generate a hash value as a result of the modification that maps to the determined partition, in some embodiments. Note in some embodiments, the modifications may be determined as the partitions are determined.

Figure 5B:
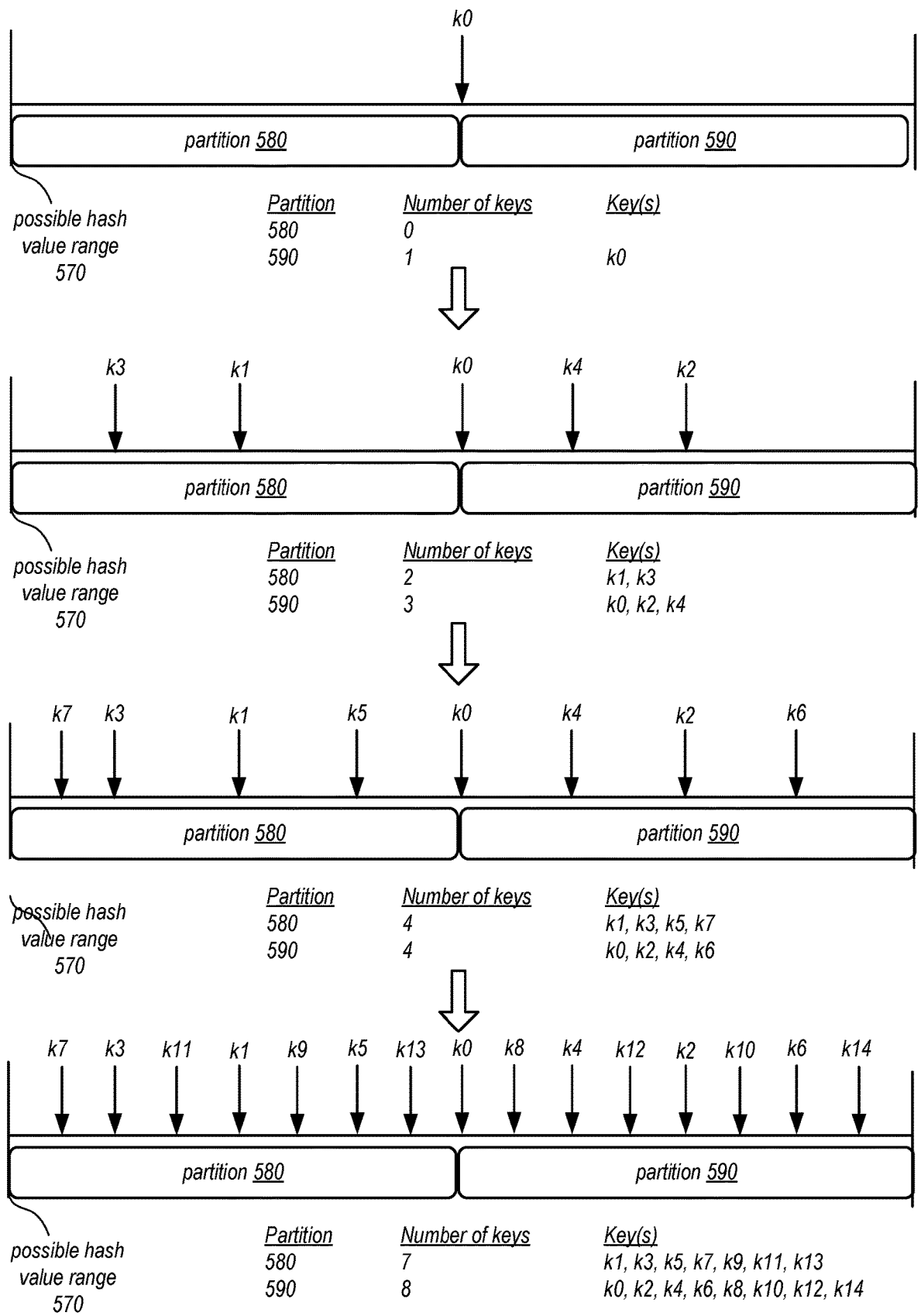
FIG. 5B is an example hash value range indicating the determination of partitions according to binary split operations, according to some embodiments.

FIG. 5B is an example hash value range indicating the determination of partitions according to binary split operations, according to some embodiments. The possible hash value range 570 may be mapped to multiple partitions, such as partitions 580 and 590. The mapping pattern of keys k0 to k14 illustrate the binary split operations performed to divide up possible hash value range 570 as additional items are added. Because binary split operations can be performed iteratively, even distribution of additional values (e.g., new items added to the table) can be maintained by continuing to follow the next iteration of the binary split operation. Key k0, for instance is mapped to the middle of the possible hash value range 570 as a result of a first binary split operation dividing the entire range in two. Next k1 is assigned to 25% as the range between 0 and 50% is divided. Likewise, k2 is mapped to 75% as the middle value between 50% and 100%. The binary operations may continue to split ranges as new keys are added, k3, splitting between 0 and 25%, k4 splitting between 50% and 75%, k5 splitting between 25% and 50% at 37.5%, k6 splitting between 75% and 100% at 87.5%, k7 splitting between 0% and 12.5% at 6.25%, k8 splitting between 50% and 62.5% at 56.25%, k9 splitting between 25% and 37.5% at 31.25%, k10 splitting between 75% and 87.5% at 81.25%, k11 splitting between 12.5% and 25% at 18.75%, k12 splitting between 62.5% and 75% at 68.75%, k13 splitting between 37.5% and 50% at 43.75%, and k14 splitting between 87.5% and 100% at 93.75%. In this way, partition assignments are alternately subdividing ranges in each partition (e.g., subdividing 50%, then 25%, then 12.5% and so on) to ensure evenly distributed numbers of keys to partitions.

Figure 6:
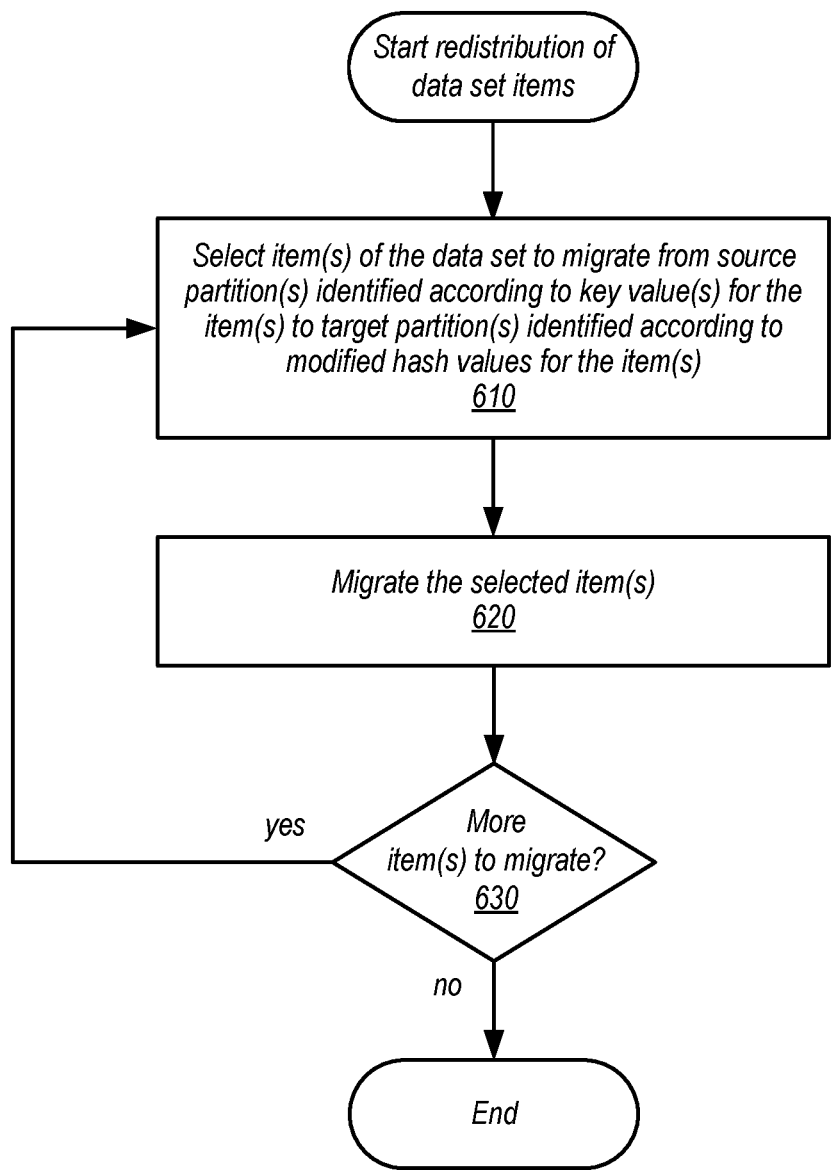
FIG. 6 is a high-level flowchart illustrating various methods and techniques to select and migrate items to target partition identified according to a secondary hashing scheme, according to some embodiments.

FIG. 6 is a high-level flowchart illustrating various methods and techniques to select and migrate items to target partition identified according to modified key values, according to some embodiments. As indicated at 610, item(s) of the data set may be selected to migrate from source partition(s) identified according to key value(s) for the item(s) to target partition(s) identified according to modified hash values for the item(s) (e.g., modified hash values generated from modified key values or a different hash function applied to the same key values). Selection may be performed in order to perform migration as a background or low impact operation in some embodiments. For example, the effects of migrating an item to a source and target partition may be compared so the migration is not performed if the item might stress, over tax, or over utilize one or both of the partitions, in some embodiments. Item selection may be throttled during high access request volume or the number of items that can be selected at a time limited so as not to make more than a small portion of the data set unavailable at any one time.

As indicated at 620, the selected items may be migrated, in some embodiments. For example, operations to read the item from the source partition and write the item to the target partition may be performed. In some embodiments, migration may be performed by redirect write requests to the target partition instead of the source partition. As indicated at 630, a determination may be made as to whether more items need to be migrated, in some embodiments. If more items remain to be migrated, then selection and migration may be performed again until all items are migrated. Upon completion of migration of all items, in some embodiments, the mappings between current key values and modified key values may be deleted.

Figure 7:
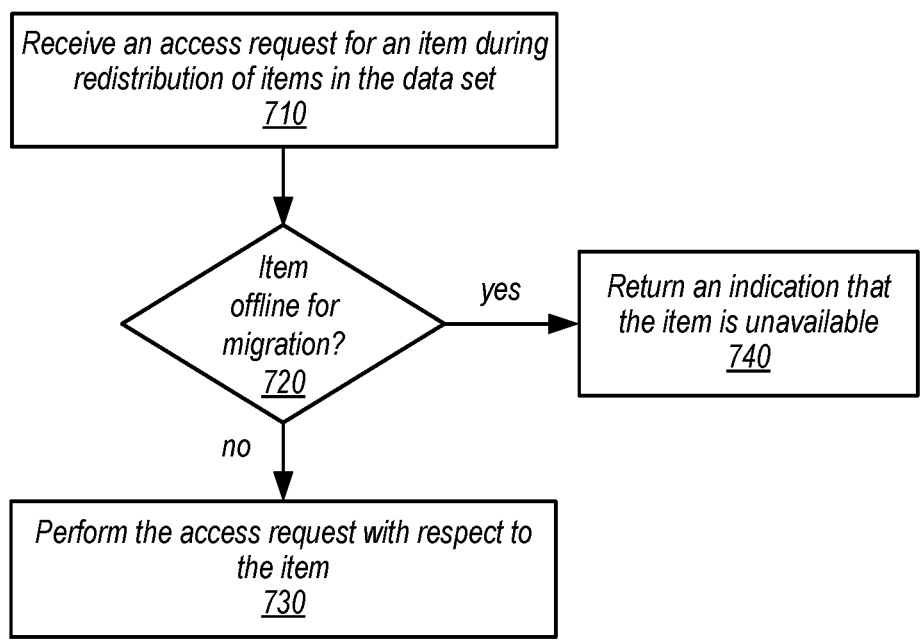
FIG. 7 is a high-level flowchart illustrating various methods and techniques to process access requests received for items in a data set that is being redistributed, according to some embodiments.

FIG. 7 is a high-level flowchart illustrating various methods and techniques to process access requests received for items in a data set that is being redistributed, according to some embodiments. As indicated at 710, an access request for an item may be received during redistribution of items in a data set, in some embodiments. An access request may be a request to read, write, delete, change or otherwise modify the item. As indicated at 720, a determination may be made as to whether the item is offline for migration, in some embodiments. For example, items selected for migration may be marked, located, or otherwise made unavailable for access requests for the duration of that items migration. Once migration is complete the access request may be allowed.

For offline items, an indication may be returned that the item is unavailable, as indicated at 740. Alternatively, in some embodiments, the access request may be queued or buffered until the item becomes available again. For online items not being migrated, the access request may be performed with respect to the item, as indicated at 730. Performance of the access request may include determining whether or not the item has been migrated, in some embodiments. If already migrated, then the item may be found by determining the partition that stores the item according to a hash value generated from the modified key value for the item, in some embodiments. If not migrated, then the partition identified by applying the hash value to the current key value may be accessed.

FIGS. 8A-8C are a high-level flowcharts illustrating various methods and techniques for handling access requests for write-once items being redistributed, according to some embodiments. Write-once items may be migrated by transitioning writes and reads to the target partition over time. In this way, user access to the data set is still allowed, making the redistribution of data values an online operation that may be performed in the background or alongside access request processing. In FIG. 8A, read request handling is illustrated, according to some embodiments. As indicated at 810 a request to read an item of a data set may be received, in some embodiments. For example the read request may be received as part of a query that is directed to or includes the item.

As indicated at 812, a determination may be made as to whether the item has been or is being migrated, in some embodiments. For items being migrated, the item read from a partition identified according to a key value for the item may be returned, as indicated at 820. If the item is being migrated or has been migrated, then as indicated at 814 the item may be read from a partition identified according to a key value for the item, in some embodiments. An item may be read from a partition identified according to a modified hash value for the item, as indicated at 816, in some embodiments. As indicated at 818, an authoritative version of the item may be determined based on the versions of the items returned by the reads at 814 and 816 (e.g., by comparing item version numbers or other indicators, such as timestamps, which may indicate which item was last updated). The last updated item may be selected as the authoritative version of the item returned, in some embodiments. In instances where an item may include valid values in both the source partition and target partition versions, such as when the item is a queue that includes one or multiple values, a merged version of the item read from both partitions may be returned as the authoritative version, in some embodiments.

FIG. 8B illustrates delete request handling. As indicated at 830, a request to delete an item of a data set may be received, in some embodiments. If the item has been or is being migrated, then as indicated at 836, the item may be deleted at a partition identified according to a key value for the item, in some embodiments (e.g., by generating the hash value using the current key value as the input to the hash function). If the item has been or is being migrated, then as indicated at 834 the item may also be deleted at a partition identified according to a modified hash value for the item (e.g., generated according to the techniques discussed above), in some embodiments.

FIG. 8C illustrates write request handling. As indicated at 840, a request to write to an item of a data set may be received, in some embodiments. If the item has been or is being migrated, write the item at the partition identified according to a modified hash value for the item, as indicated at 844, in some embodiments. If the item has not yet been migrated, then write to the item at a partition identified according to a key value for the item, according to some embodiments.

The methods described herein may in various embodiments be implemented by any combination of hardware and software. For example, in one embodiment, the methods may be implemented by a computer system (e.g., a computer system as in FIG. 9) that includes one or more processors executing program instructions stored on a computer-readable storage medium coupled to the processors. The program instructions may implement the functionality described herein (e.g., the functionality of various servers and other components that implement the distributed systems described herein). The various methods as illustrated in the figures and described herein represent example embodiments of methods. The order of any method may be changed, and various elements may be added, reordered, combined, omitted, modified, etc.

Figure 9:
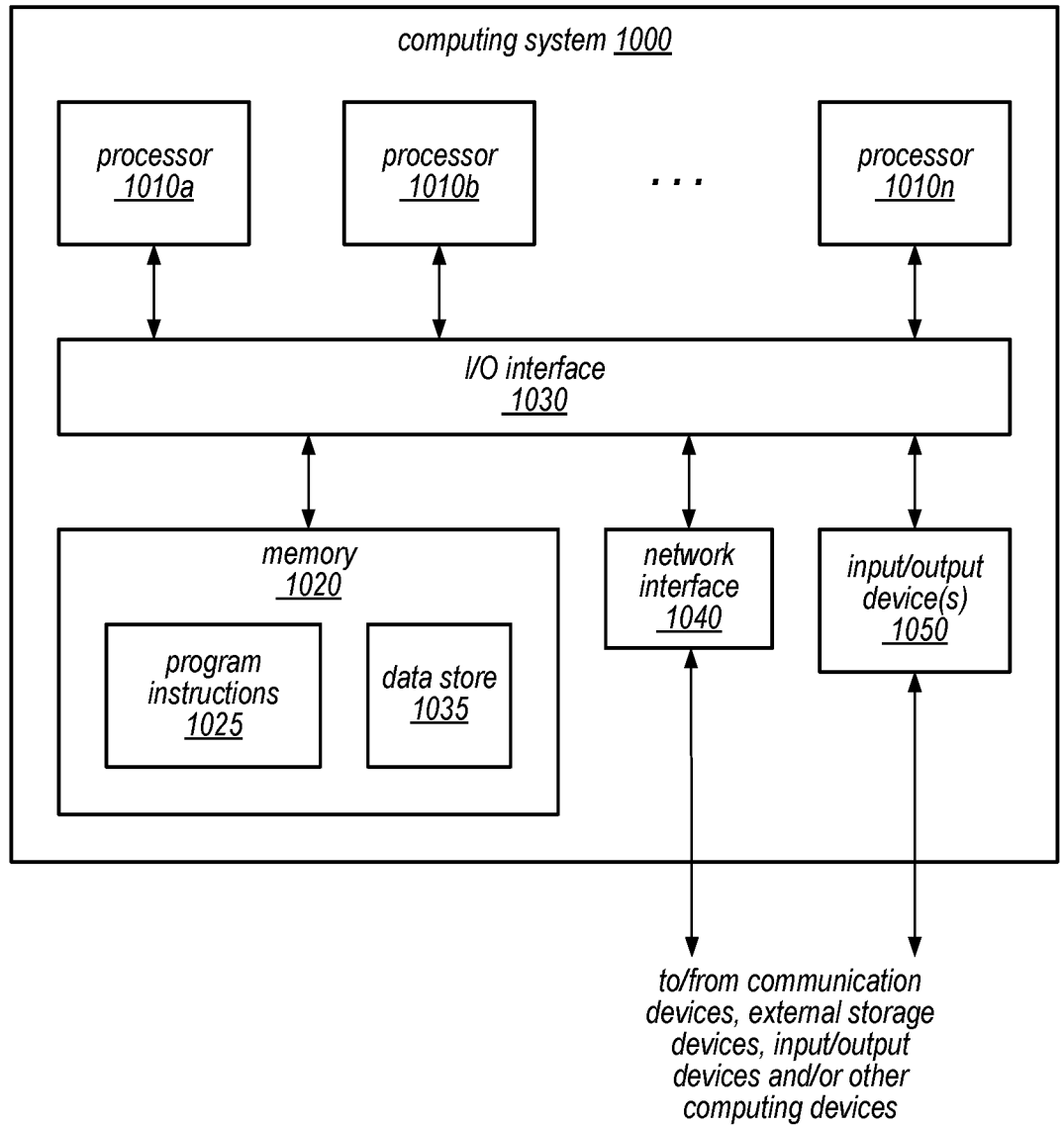
FIG. 9 is a block diagram illustrating an example computing system, according to some embodiments.

Embodiments to implement redistributing a data set amongst partitions according to a secondary hashing scheme as described herein may be executed on one or more computer systems, which may interact with various other devices. One such computer system is illustrated by FIG. 9. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or compute node, computing device or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device, keyboard, and display(s). Display(s) may include standard computer monitor(s) and/or other display systems, technologies or devices, in one embodiment. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions, in one embodiment. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device, in one embodiment. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions for execution on one of, or parallel execution on two or more of, such GPUs. The GPU(s) may implement one or more application programmer interfaces (APIs) that permit programmers to invoke the functionality of the GPU(s), in one embodiment.

System memory 1020 may store program instructions 1025 and/or data accessible by processor 1010, in one embodiment. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. A computer-accessible medium may include non-transitory storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040, in one embodiment.

In one embodiment, I/O interface 1030 may be coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000, in one embodiment. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000, in one embodiment. Multiple input/output devices 1050 may be present in computer system 1000 or may be distributed on various nodes of computer system 1000, in one embodiment.

In some embodiments, similar input/output devices may be separate from computer system 1000 and may interact with one or more nodes of computer system 1000 through a wired or wireless connection, such as over network interface 1040.

As shown in FIG. 9, memory 1020 may include program instructions 1025, that implement the various embodiments of the systems as described herein, and data store 1035, comprising various data accessible by program instructions 1025, in one embodiment. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the embodiments as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
   at least one processor;
   a memory, comprising program instructions that when executed by the at least one processor cause the at least one processor to implement a request router for routing access requests to different partitions of a data set;
   wherein the data set comprises a plurality of items stored across a plurality of partitions in a distributed data store, wherein the items are distributed across the partitions according to respective hash values generated from an application of a hash function to respective key values for the items;
   wherein the request router is configured to:
      detect a redistribution event for the data set;
      in response to the detection of the redistribution event, generate respective modified key values for the items to redistribute the items among the plurality of partitions upon application of the hash function to the respective modified key values for the items;
      in response to a receipt of an access request for one of the items:
         identify one of the partitions according to a hash value generated from an application of the hash function to the modified key value for the one item; and
         route the request for processing with respect to the identified partition.

2. The system of claim 1, wherein the request router is further configured to:
   select one or more items of the data set to migrate from one or more source partitions of the partitions identified according to the respective key values for the selected items to one or more target partitions of the partitions identified according to the respective modified key values for the selected items; and
   migrate the selected items from the source partitions to the target partitions.

3. The system of claim 1, wherein to generate the respective modified key values for the items, the request router is configured to:
   determine respective partitions mapped to portions of a possible hash value range for individual ones of the key values for the items according to a binary split operation; and
   determine respective modifications to apply to the respective key values for the items that result in hash values generated according to the hash function that maps the key values to the determined partitions.

4. The system of claim 1, wherein the distributed data store is implemented as part of a multi-tenant, non-relational data store that stores data across different storage hosts, wherein the data set is a table stored at one or more of the storage hosts along with data for one or more other tables, and wherein the redistribution event is not detected for the one or more other tables.

5. A method, comprising:
performing, by one or more computing devices:
   storing a plurality of items of a data set across a plurality of partitions in a distributed data store, wherein the items are distributed across the partitions according to respective hash values generated from an application of a hash function to respective key values for the items;
   generating respective modified hash values for the items to redistribute the items among the plurality of partitions according to a secondary hashing scheme based, at least in part, on the respective key values for the items; and
   providing access to one of the items in the data set at one of the partitions of the distributed data store identified according to the modified hash value generated for the one item.

6. The method of claim 5, further comprising:
detecting a redistribution event for the data set; and
performing the generating the respective modified hash values in response to the detecting of the redistribution event.

7. The method of claim 5, further comprising:
selecting one or more items of the data set to migrate from one or more source partitions of the partitions identified according to the respective key values for the selected items to one or more target partitions of the partitions identified according to the respective modified hash values for the selected items; and
migrating the selected items from the source partitions to the target partitions.

8. The method of claim 7, wherein migrating the selected items comprises:
   copying the selected items to the target partitions; and
   blocking access requests to the selected items during the migration of the selected items.

9. The method of claim 7, wherein the items of the data set are write-once items, wherein the one item is one of the selected items for migration, wherein the access to the one item is a request to read the one item, and wherein providing access to the one item comprises:
   reading the one item from the one partition of the distributed data store identified according to the modified hash value generated for the one item according to the secondary hashing scheme;
   reading the one item from another partition of the distributed data store identified according to the hash value generated from the application of the hash function to the key value for the one item; and
   returning an authoritative version of the item based on the reading the one item from the one partition and the reading the one item from the other partition in response to the request to read the one item.

10. The method of claim 7, wherein the items of the data set are write-once items, wherein the one item is one of the selected items for migration, wherein the access to the one item is a request to write to the one item, and wherein providing access to the one item comprises:
   performing the write to the one item from the one partition of the distributed data store identified according to the modified hash value generated for the one item according to the secondary hashing scheme.

11. The method of claim 10, wherein the write-once items are queue data structures.

12. The method of claim 5, wherein generating the respective modified hash values for the items according to the secondary hashing scheme comprises:
   determining respective partitions mapped to portions of a possible hash value range for individual ones of the key values for the items according to a binary split operation; and
   determining respective modifications to apply to the respective key values for the items that result in modified hash values generated according to the same hash function that maps the key values to the determined respective partitions.

13. The method of claim 5, wherein generating the respective modified hash values for the items comprises applying a different hash function to the respective key values for the items.

14. A non-transitory, computer-readable storage medium, storing program instructions that when executed by one or more computing devices cause the one or more computing devices to implement:
   storing a plurality of items of a data set across a plurality of partitions in a distributed data store, wherein the items are distributed across the partitions according to respective hash values generated from an application of a hash function to respective key values for the items;
   generating respective modified hash values for the items to redistribute the items among the plurality of partitions according to a secondary hashing scheme based, at least in part, on the respective key values for the items;
   receiving an access request for one of the items in the data set;
   in response to receiving the access request:
      identifying one of the partitions of the distributed data store that includes the one item according to the modified hash value generated for the one item according to the secondary hashing scheme; and
      sending the access request for processing with respect to the identified partition.

15. The non-transitory, computer-readable storage medium of claim 14, wherein the program instructions cause the one or more computing devices to further implement:
   detecting a redistribution event for the data set; and
   performing the generating the respective modified hash values in response to the detecting of the redistribution event.

16. The non-transitory, computer-readable storage medium of claim 14, wherein the program instructions cause the one or more computing devices to further implement:
   selecting one or more items of the data set to migrate from one or more source partitions identified according to the respective key values for the selected items to one or more target partitions identified according to the respective modified hash values for the selected items; and
   migrating the selected items from the source partitions to the target partitions.

17. The non-transitory, computer-readable storage medium of claim 16, wherein the items of the data set are write-once items, wherein the one item is one of the selected items for migration, wherein the access request for the one item is a request to read the one item, and wherein, in providing access to the one item, the program instructions cause the one or more computing devices to implement:
- reading the one item from the one partition of the distributed data store identified according to the modified hash value generated for the one item according to the secondary hashing scheme;
- reading the one item from another partition of the distributed data store identified according to the hash value generated for the one item from the application of the hash function to the key value for the one item; and
- returning a merged version of the item read from the one partition and the other partition in response to the request to read the one item.

18. The non-transitory, computer-readable storage medium of claim 16, wherein the items of the data set are write-once items, wherein the one item is one of the selected items for migration, wherein the access request for the one item is a request to delete the one item, and wherein, in providing access to the one item, the program instructions cause the one or more computing devices to implement:
- performing a delete of the one item at the one partition of the distributed data store identified according to the modified hash value generated for the one item according to the secondary hashing scheme; and
- performing a delete of the one item at another partition of the distributed data store identified according to the hash value generated for the one item from the application of the hash function to the key value for the one item.

19. The non-transitory, computer-readable storage medium of claim 14, wherein, in generating the respective modified hash values for the items, the program instructions cause the one or more computing devices to implement:
- determining respective partitions mapped to portions of a possible hash value range for individual ones of the key values for the items according to a binary split operation; and
- determining respective modifications to apply to the respective key values for the items that result in modified hash values generated according to the same hash function that maps the key values to the determined respective partitions.

20. The non-transitory, computer-readable storage medium of claim 19,
- wherein the program instructions cause the one or more computing devices to further implement storing the respective modified key values as part of a symbol table; and
- wherein, in providing access to the one item, the program instructions cause the one or more computing devices to implement accessing the symbol table to obtain the modified key value for the one item.

* * * * *